(12) United States Patent
Goodman et al.

(10) Patent No.: US 6,192,171 B1
(45) Date of Patent: Feb. 20, 2001

(54) DYNAMIC FIBER OPTIC SWITCH WITH ARTIFICIAL MUSCLE

(76) Inventors: Albert Goodman, P.O. Box 30062, Albuquerque, NM (US) 87190; Mohsen Shahinpoor, 9910 Tanoan Dr. NE., Albuquerque, NM (US) 87111

(*) Notice: Under 35 U.S.C. 154(b), the term of this patent shall be extended for 0 days.

(21) Appl. No.: 09/513,657

(22) Filed: Feb. 25, 2000

Related U.S. Application Data

(60) Provisional application No. 60/121,778, filed on Feb. 26, 1999.

(51) Int. Cl.[7] ........................................... G02B 6/26
(52) U.S. Cl. ........................... 385/16; 385/19; 385/20; 385/22
(58) Field of Search ............................... 385/16, 19, 20, 385/22, 23, 24, 25

(56) References Cited

U.S. PATENT DOCUMENTS

| | | | |
|---|---|---|---|
| 4,223,978 | 9/1980 | Kummer et al. | 350/96.2 |
| 4,303,302 * | 12/1981 | Ramsey et al. | 385/16 |
| 4,415,228 | 11/1983 | Stanley | 350/96.2 |
| 4,512,036 | 4/1985 | Laor | 455/612 |
| 4,512,627 | 4/1985 | Archer et al. | 350/96.2 |
| 4,543,663 | 9/1985 | Laor | 455/600 |
| 4,651,343 | 3/1987 | Laor | 455/600 |
| 4,759,597 | 7/1988 | Lemonde | 350/96.2 |
| 4,790,624 * | 12/1988 | Van Hoye et al. | 385/118 |
| 4,844,577 | 7/1989 | Ninnis et al. | 350/96.29 |
| 4,886,335 | 12/1989 | Yanagawa et al. | 350/96.2 |
| 5,004,318 | 4/1991 | Ohashi | 350/96.2 |
| 5,024,497 * | 6/1991 | Jebens | 385/16 |
| 5,187,758 * | 2/1993 | Ueda et al. | 385/16 |
| 5,311,410 * | 5/1994 | Hsu et al. | 362/20 |
| 5,524,153 | 6/1996 | Laor | 385/16 |
| 5,647,033 | 7/1997 | Laughlin | 385/16 |
| 5,699,463 | 12/1997 | Yang et al. | 385/22 |
| 5,812,711 | 9/1998 | Glass et al. | 385/37 |
| 5,841,912 | 11/1998 | Mueller-Fiedler et al. | 385/7 |

OTHER PUBLICATIONS

M. Shahinpoor et al. "Ionic polymer–metal composites (IPMCs) as biomimetic sensors, actuators and artificial muscles, a review" Smart Mater. Struct. 7(1998) R15–R30.

* cited by examiner

Primary Examiner—Hemang Sanghavi
Assistant Examiner—Benjamin Cushwa
(74) Attorney, Agent, or Firm—Peacock, Myers & Adams

(57) ABSTRACT

An optical switch comprised of an artificial muscle activation material that is adhered longitudinally around an optical channel, such as an optical fiber or group of fibers, to cause the channel to undulate in 2-½ dimensions when the material is activated by a voltage source via electrodes on the surface of the artificial muscle activation material. The material can be applied to the optical channel in a series of longitudinal strips or as a jacket surrounding the channel. When activated by a voltage source, be it a constant source or a variable source varying in amplitude, frequency or polarity, the artificial muscle material bends, causing the optical channel to also bend. The artificial muscle activation material can be formed into an optical channel itself when formed into a channel and cladded to have internal reflection.

23 Claims, 6 Drawing Sheets

DYNAMIC FIBER OPTIC SWITCH WITH ARTIFICIAL MUSCLE

CROSS-REFERENCE TO RELATED APPLICATIONS

This application claims the benefit of the filing of U.S. Provisional Patent Application Serial No. 60/121,778, entitled "Dynamic Fiber Optic Switch and Fiber Optic Cable Switch," filed on Feb. 26, 1999, and the specification thereof is incorporated herein by reference.

A related application entitled "Dynamic Fiber Optic Switch" is being concurrently herewith, to Albert Goodman, Attorney Docket No. 70350-9101, and the specification thereof is incorporated herein by reference.

BACKGROUND OF THE INVENTION

1. Field of the Invention (Technical Field)

The present invention relates to fiber optic switches, particularly the use of electro- or magneto-active materials to cause optical fibers to undulate.

2. Background Art

Note that the following discussion refers to a publication by author(s) and year of publication, and that due to recent publication dates certain publications are not to be considered as prior art vis-a-vis the present invention. Discussion of such publication herein is given for more complete background and is not to be construed as an admission that the publication is prior art for patentability determination purposes.

Present day optical fiber technologies are revolutionizing the telecommunications industry. Tremendous advances have been made in the field of telecommunications over the past decade. It has been estimated that this technology is capable of carrying tens of millions of conversations simultaneously on a single optical fiber. Optical fiber communication systems offer many advantages over systems that use copper wire or radio frequency links as a transmission medium. They include lower transmission losses, higher bandwidths, higher transmission rates, lower implementation costs, greater reliability and greater electrical isolation characteristics. It is clear that optical fiber communication will dominate the telecommunications industry in the very near future because of advantages such as these.

Fiber optic switching is an important component in any telecommunication system. These systems use switches to establish communication channels among two or more of their interfaces. An optical fiber switch is capable of optically connecting, or aligning, any one of a first group of optical fibers with any one of a second group of optical fibers, or vice versa, enabling an optical signal to propagate through the optical interface junction from one fiber to the other.

When two optical fibers are aligned end-to-end, light entering one fiber (the input or sending fiber) will continue into and through the second fiber (the output or receiving fiber) while the two adjacent ends, or faces, are aligned and close together. Fiber optic switches misalign or disjoin the adjacent ends of the fibers by moving one or both of the two ends. By moving, for example, the first fiber's end to a new location, the signal, in this case light, can be redirected into another, third fiber, by aligning the first fiber's end with an end of the third fiber.

Lateral separation of the two adjacent ends will result in loss of light between the two fibers so that a light absorber is provided beside the fiber which either moves into place as the receiving fiber moves away or stays in place as the sending fiber moves away. Space is provided for this motion. This effectively switches the signal off. The discontinuity between the fiber ends may be either perpendicular to the fiber axis or at some angle to the axis but the gap is minimal when the fibers are aligned. Fibers may be collected into a bundle, a fiber optic cable, with a structure set up at the active location to permit the required motion of a fiber end. A fiber bundle can be separated from a circular bundle cross-section to a linear arrangement where the fibers are in a straight line at the switch but reformed into a bundle again at the device exit.

Optical fiber switches generally utilize fiber positioning means, alignment signal emitter means and computer control means. Normally, a fiber positioning means is provided near the end of one fiber to selectively point the end of that fiber in one fiber group toward the end of another fiber in the other fiber group to perform a switched optical transmission. Patents proposing to perform such switching actions in fiber optic telecommunication systems include: U.S. Pat. No. 5,024,497, to Jebens, entitled "Shape Memory Alloy Optical Fiber Switch," which discusses switching activated by a shape memory alloy wire in a transverse direction. U.S. Pat. No. 4,512,036, entitled "Piezoelectric Apparatus for Positioning Optical Fibers," U.S. Pat. No. 4,543,663, entitled "Piezoelectric Apparatus for Positioning Optical Fibers," U.S. Pat. No. 4,651,343, entitled "Piezoelectric Apparatus for Positioning Optical Fibers," and U.S. Pat. No. 5,524,153, entitled "Optical Fiber Switching System and Method Using Same," all to Laor, use piezoelectric bimorphs for positioning optical fiber switches. U.S. Pat. No. 4,303,302, to Ramsey, et al., entitled "Piezoelectric Optical Switch" discusses other forms of piezoelectric bimorphs for optical fiber switching.

Other patents discussing fiber optic switching include: U.S. Pat. No. 5,812,711, to Glass, et al., entitled "Magnetostrictively Tunable Optical Fiber Gratings;" U.S. Pat. No. 5,812,711 to Malcolm, et al., entitled "Magnetostrictive Tunable Optical-Fiber Gratings;" U.S. Pat. No. 4,759,597, to Lamonde, entitled "Mechanical Switch for Optical Fibers;" U.S. Pat. No. 4,415,228, to Stanley, entitled "Optical Fiber Switch Apparatus;" U.S. Pat. No. 5,004,318, to Ohashi, entitled "Small Optical Fiber Switch;" U.S. Pat. No. 4,844,577, to Ninnis, et al, entitled "Bimorph Electro Optic Light Modulator;" U.S. Pat. No. 4,512,627, to Archer, et al., entitled "Optical Fiber Switch, Electromagnetic Actuating Apparatus with Permanent Magnet Latch Control;" U.S. Pat. No. 5,699,463, to Yang, et al., entitled "Mechanical Fiber Optic Switch;" U.S. Pat. No. 5,841,912, to Mueller-Fiedler, entitled "Optical Switching Device;" U.S. Pat. No. 5,647,033, to Laughlin entitled "Apparatus for Switching Optical Signals and Method of Operation;" U.S. Pat. No. 4,886,335, to Yanagawa, et al., entitled "Optical Fiber Switch System;" and U.S. Pat. No. 4,223,987, to Kummer, et al., entitled "Mechanical Optical Fiber Switching Device." These patents disclose various methods for fiber optic switching, including mechanical devices such as rods, motors, and adapters, as well as wave guides and reflectors.

The Ohashi, Ramsey, Ninnis, Stanley, Jebens, Glass, and Laor patents disclose various methods and apparatuses that use piezoelectrics, magneto-strictive materials, and shape memory alloys, for bending the fiber; however, these patents are either complicated in their configurations or require additional mechanical means beyond these materials. The present invention overcomes deficiencies in the prior art by directly adhering an electro- or magneto-active material to the optical fiber, or fiber optic cable, itself, longitudinally to cause the fiber to undulate to the desired "2-½-D" position, without additional means of support or other mechanical means. The designation 2-½-D signifies that the displacement of the fiber may produce both a lateral and a longitudinal change. The present invention is, therefore, a novel configuration for undulating an optical fiber or fiber optic cable.

SUMMARY OF THE INVENTION
(DISCLOSURE OF THE INVENTION)

The present invention is an optical switch comprising an artificial muscle activation material adhered longitudinally around an optical channel to cause the channel to undulate in 2½ dimensions when the material is activated. Preferably, the artificial muscle activation material is adhered longitudinally around an end of the optical channel. The activation material can be activated with a source that can vary in at least one of amplitude, frequency, or polarity. The activation material can comprise either a plurality of artificial muscle activation strips or an artificial muscle jacket. If the artificial muscle activation strips are used, preferably they can be arranged symmetrically around the channel, and at least three activation strips are used. If four activation strips are used, then two of the four strips are oppositely polarized and located approximately 180° opposite one another, and the remaining two are oppositely polarized and located approximately 180° opposite one another and located orthogonally to the first two.

The present invention is also an optical switch comprised of an input having a plurality of input optical channels; a spherical segment output having a plurality of output optical channels arranged spherically around the input; and an artificial muscle activation material adhered longitudinally around the input optical channels to cause the input optical channels to undulate in 2-½ dimensions and align with desired output optical channels when the activation material is activated. Preferably, the artificial muscle activation material is adhered longitudinally around an end of each of the input optical channels to cause that end to undulate. The activation material can be activated with a source that varies in at least one of amplitude, frequency, or polarity. The activation material can be either an artificial muscle activation strip or an artificial muscle jacket. If a plurality of artificial muscle activation strips are used, preferably they are arranged symmetrically around the input output channels and preferably at least three activation strips are used. If four activation strips are used, then preferably two of the four activation strips are oppositely polarized and located approximately 180° opposite one another, and the remaining two are oppositely polarized and located approximately 180° opposite one another, and located orthogonally to the first two.

The present invention is further a method of switching optical channels comprising the steps of adhering an artificial muscle material longitudinally around an optical channel and activating the material to cause the channel to undulate in 2-½ dimensions. Activating the material can comprise activating the material with a source that varies in at least one of amplitude, frequency, or polarity. The step of adhering an artificial muscle material comprises providing at least one input optical channel with a first end and a second end, wherein the artificial muscle material is adhered longitudinally around the first end; providing at least two output optical channels arrayed within 2-½ dimensions of the first end of the at least one input optical channel; and wherein the step of activating the artificial muscle material comprises activating the artificial muscle material to cause the first end of the at least one input optical channel to undulate in 2-½ dimensions to align with one of the at least two output optical channels. Adhering an artificial muscle material longitudinally around an optical channel can comprise adhering either a plurality of artificial muscle activation strips or an artificial muscle jacket. Preferably, adhering an artificial muscle material comprises adhering a plurality of artificial muscle activation strips longitudinally around an optical channel and arranging the activation strips symmetrically around the channel. The step of adhering a plurality of activation strips preferably comprises adhering at least three activation strips. The step of adhering at least three activation strips, can comprise adhering four activation strips symmetrically around the channel; oppositely polarizing two of the four activation strips and locating them approximately 180° opposite one another on the channel; and oppositely polarizing the remaining two activation strips and locating them approximately 180° opposite one another and orthogonal to the first two.

The present invention is still further a method of optical switching providing an input having a plurality of input optical channels; providing a spherical output having a plurality of output optical channels arranged spherically around the input; and adhering an artificial muscle material longitudinally around the input optical channels and activating the material to cause the input optical channels to undulate in 2-½ dimensions and align with desired output optical channels.

The present invention is also an optical channel comprising an artificial muscle activation material cladded to have internal reflection, and having electrodes coated upon the activation material to cause the optical channel to undulate in 2-½ dimensions when the material is activated via the electrodes.

A primary object of the present invention is to provide an efficient and versatile means for switching an optical fiber or fiber optic cable by undulating the fiber, or cable.

Another object of the present invention is to undulate an optical fiber by placing electro- or magneto-active material strips longitudinally along the optical fiber in order to move the optical fiber in 2-½ dimensions.

A primary advantage of the present invention is that it does not require additional mechanical means beyond the electro- or magneto-active materials adhered directly to the fiber.

Still another advantage of the present invention is that the optical fiber can be moved in 2-½ dimensions.

Other potential advantages provided by the present invention, due to its simplicity and design, are long life, reliability, low cost, and a variety of applications.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

Figure 1:
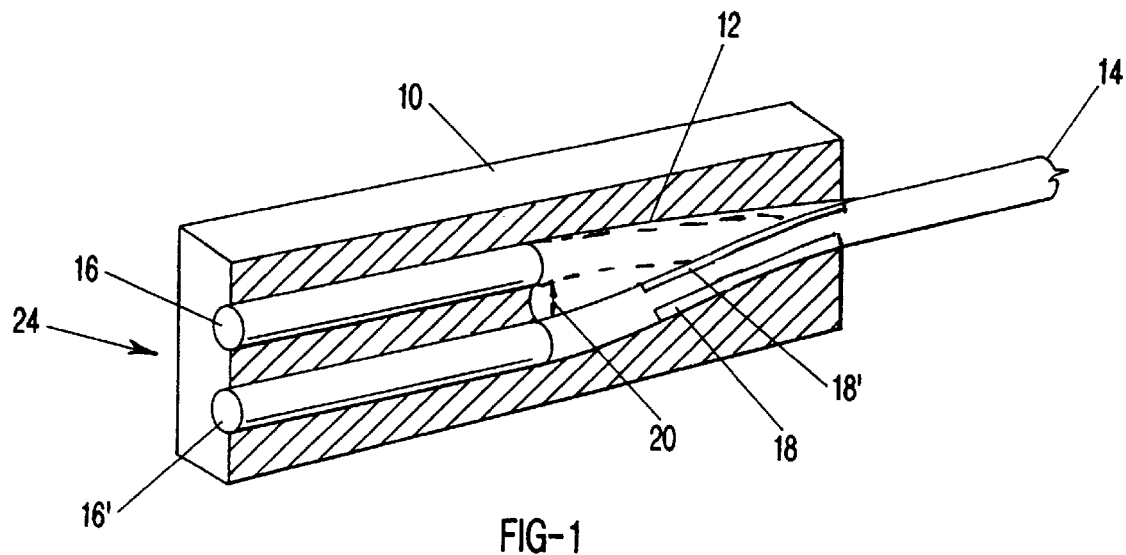
FIG. 1 is a cut-away view of the fiber optic switch of the present invention showing a single input fiber undulating between two output fibers in accordance with the present invention.

The present invention is a novel method and apparatus for optical fiber switching which is based on adhering as part of the body of the fiber itself, electro- or magneto-active means in the form of wires and/or strips adhered longitudinally to the fiber itself to quickly undulate the end of a given optical fiber, from one group of fibers, to align with another optical fiber, from another group of optical fibers, in a telecommunication system. It is to be understood that the word undulating, including other tenses and forms of that word, are herein used to mean displacement and undulation of the fiber or fibers. The present invention can either displace a fiber to a new position or cause the fiber to undulate back and forth between two or more positions as required in the application of the invention. The present invention accomplishes undulation in "2-½-D." In other words, the end of the optical fiber to be moved is moved in both the x-axis and y-axis directions, as well as somewhat in the z-axis direction necessarily due to the bending of the fiber. The electro- or magneto-active means include smart materials such as shape-memory alloys or polymer strips or wires, piezoelectric (piezoceramics, piezopolymers, etc.,) strips, magnetostrictive strips, and electro- or magneto-active polymers such as ionic polymeric conductive composites (artificial muscles). The electro- or magneto-active means are referred to herein as "activation strips."

The fundamental principle is to extend an activation strip longitudinally along and adhered to an optical channel, be it an optical fiber, a group of fibers, or a fiber optic cable. The activation strip can be attached by cement, epoxy or glue between the activation strip and the fiber. Other bonding materials may also be used.

The present invention either switches an optical signal on or off, or directs an optical signal into a variety of output optical fiber channels. This is done by moving the end of an input fiber, or group of fibers in a fiber cable, toward or away from the end of an output fiber, several output fibers, a group of fibers or several groups of fibers. Of course, output fibers can additionally or alternatively be moved in the same manner as described for the input fiber or fibers to provide other switching functions. It is to be understood that while the fibers to be moved and having the activation strips are referred to as "input" fibers and those receiving the signal therefrom are "output" fibers, the signal can of course travel in the opposite direction so that the output fiber or fibers become the input fiber or fibers and vice versa. The labels input and output are merely used for simplicity of explanation.

The switch provides on-off action by displacing the input and output fibers by at least a complete fiber diameter. A partial light intensity change may be accomplished by a controlled displacement distance. A diagonal slice arrangement between the ends of the input and output fibers will permit an intensity variation dependent upon separation of the two faces of the input and output fibers. Redirecting the optical signal is accomplished by undulating the end of the input fiber until it is aligned with the appropriate output fiber or vice versa. Then, by having the faces of the ends of the input and output fiber to be joined, cut at diagonals to "fit" each other like two pieces in a puzzle, it allows the input fiber to "snap" into place against the receiving end of the output fiber and be more easily held there.

The displacement of a fiber is accomplished by the activation strips adhered longitudinally to each fiber near the active end where displacement or alignment is needed. Attention is now turned to the figures. These figures are only to present examples of what can be accomplished in accordance with the present invention.

FIG. 1 shows fiber optic switch 10 having input fiber 14 and output fibers 16 and 16'. Channel guide 12 provides space in which input fiber 14 can undulate. Input fiber 14 undulates in the area generally referred to as 20 and aligns with either output fiber 16 or 16', therefore transmitting the signal out of end 24 of switch 10 in the appropriate channel. In this figure, two activation strips 18 and 18' are shown adhered to input fiber 14. The operation of the activation strips is further described below.

Figure 2:
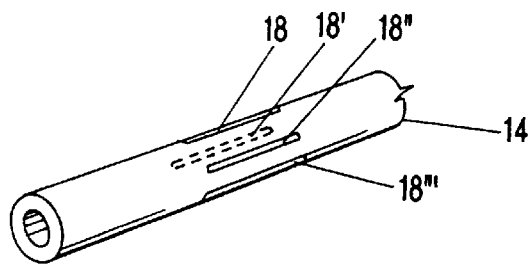
FIG. 2 shows four activation strips adhered to an optical fiber in accordance with the present invention.
Figure 3:
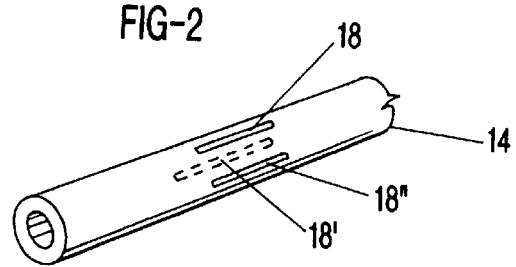
FIG. 3 shows three activation strips adhered to an optical fiber in accordance with the present invention.

FIG. 2 shows input fiber 14 having four activation strips 18, 18', 18", and 18'", adhered along the length of input fiber 14 at 0°, 90°, 180° and 270° for a fine degree of control. FIG. 3 shows three activation strips 18, 18' and 18" adhered along input fiber 14 at 0°, 120° and 240°. Of course, any number of activation strips, preferably two or more, can be adhered to input fiber 14 longitudinally at any circumferential location in order to achieve the desired amount of control and fiber movement. While activation strips are shown adhered to an end of the input fiber, the invention is not limited to movement of the input fiber alone, but could of course include moving the output fiber or fibers as well by the same method.

Figure 4:
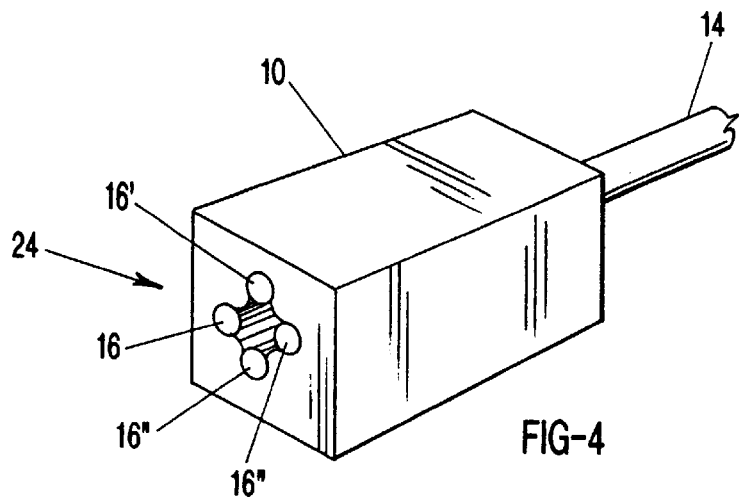
FIG. 4 shows the fiber optic switch having one-fiber input and four-fiber output capability in accordance with the present invention.
Figure 5:
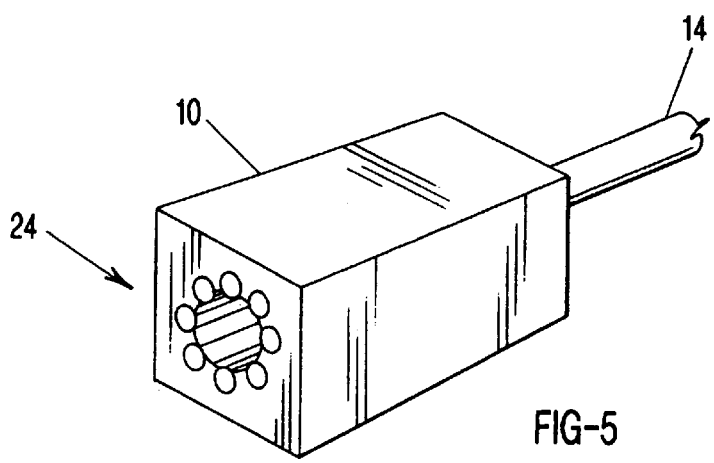
FIG. 5 shows a one fiber input and eight fiber output capability in accordance with the present invention.
Figure 6:
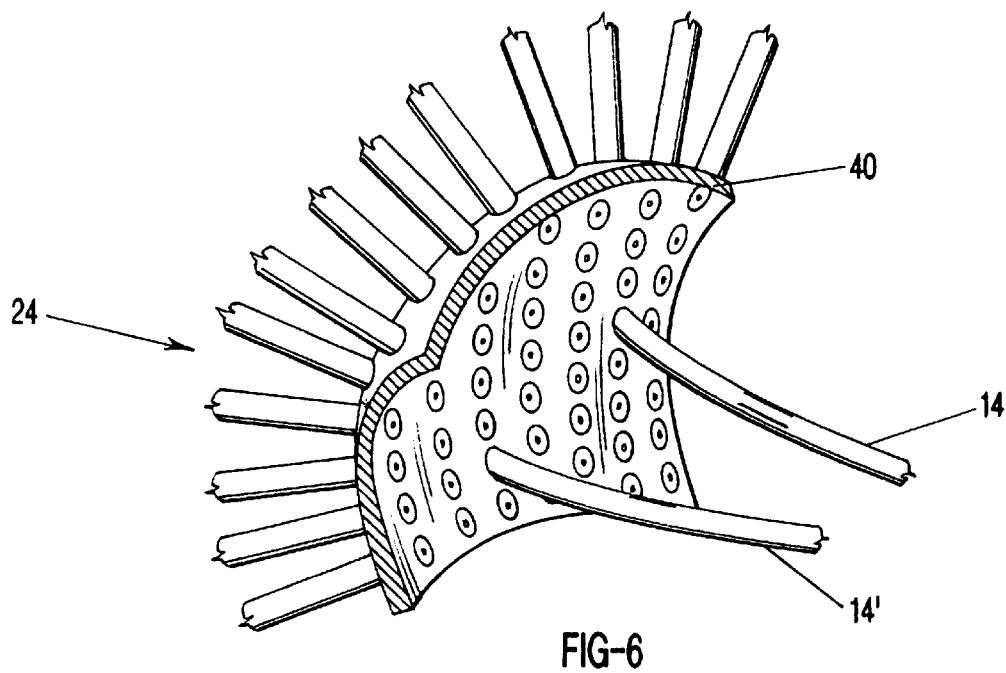
FIG. 6 shows a two fiber input and a spherical segment output having a plurality of fiber outputs in accordance with the present invention.

FIGS. 4 and 5 show fiber optic switch 10 with a single input fiber 14 and a plurality of output fibers to which input fiber 14 can be aligned and transmit signal to. FIG. 6 shows an embodiment wherein a spherical segment of output fibers is within the reach of input fibers. Input fibers, such as 14 and 14', are inserted into the hollow sphere 40 and undulate to the appropriate output fiber. Activation strips along the input fibers cause these fibers to move to the desired output fiber location in order to transmit the signal in the appropriate direction. Sphere 40 may be a sphere segment, such as a hemisphere, or any other defined portion of a sphere, provided that the output fibers are arranged spherically about the axis of the input fiber or fibers. Furthermore, as described above regarding the designations "input" and "output," in FIG. 6 fibers 14 and 14' can constitute output fibers while the fibers shown at 24 constitute input fibers.

Figure 7:
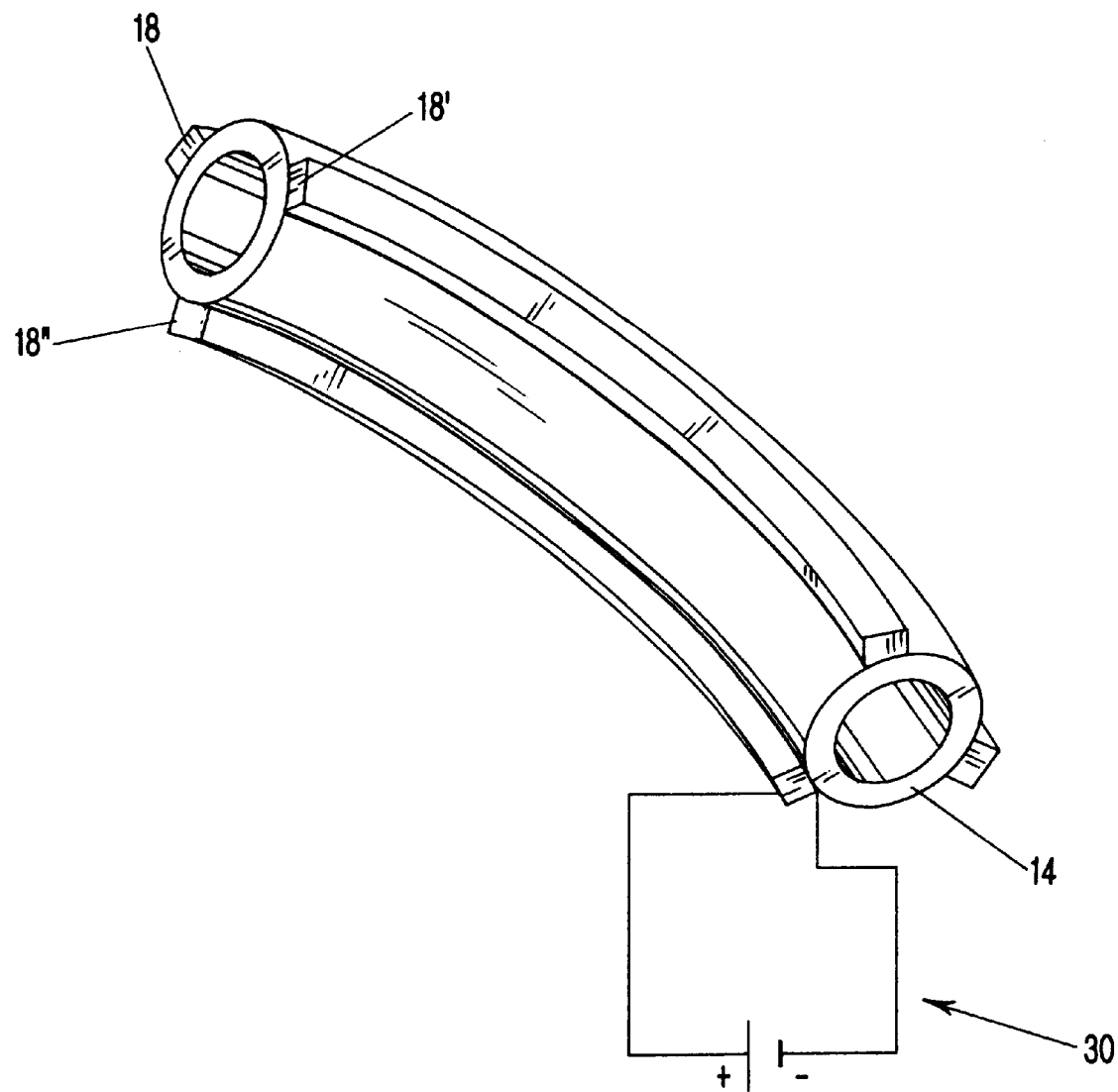
FIG. 7 shows a portion of an optical fiber having three activation strips adhered along the portion of the fiber to be bent, as well as the voltage supply to an activation strip.

FIG. 7 is a blown-up view showing a portion of the fiber to be controlled, whether it be input fiber 14 or any other fiber. Three activation strips are shown adhered along input fiber 14. While voltage source 30 is shown connecting to activation strip 18", it is to be understood that each activation strip requires its own voltage supply for activation. Each activation strip is coated by electrodes to which activation voltages are applied. Electrodes can be either thin metallic or conductive films such as carbon or graphite, or a thin wire connection. These are easily attached by automated manufacturing processes known in the art. Piezoelectric materials require a high voltage and low current because they are more or less non-conductors while shape-memory alloys require moderate voltage and current to heat them, and require up to a few tens of volts and up to 1 or 2 amps of current. One target design voltage for activation is approximately 5 volts with a maximum current of approximately 400 mA. This is a typical voltage and current compatible with computer voltages for computer and data acquisition system integration. However, the voltages required may be lower depending on the dimension of the fibers to be moved. In general, the smaller the fiber diameters the smaller the voltage required to activate and move the activation strip. Typically, for a 1 mm diameter fiber to be moved at most 2 mm one would need a voltage of about 2 volts. Each activation strip 18 is comprised of an electro- or magneto-active material as will now be described. While only two activation strips are discussed with reference to each embodiment, this is done for simplicity and it is to be understood that the invention requires at least two activation strips and most preferably requires at least three activation strips, such as shown in FIG. 7, for the desired 2-½-D control. Either the polarity of the voltage or magnetic field source, or the polarity of the electro- or magneto-strictive material itself can be altered to effect expansion and contraction, or bending, of the material as will be described next.

In a first embodiment, a plurality of magneto-strictive strips, such as Terfenol-D, approximately a few centimeters long, for example two cm, and of a width of a few microns are adhered in a symmetrical fashion longitudinally to each fiber near the end to be undulated. These activation strips are powered by an imposed magnetic field and either expand or contract according to the polarity of the magnetic field. The magnetic field is normally produced around a magneto-strictive material by a coil arrangement. In this embodiment, the coil is attached to or embedded in the activation strip and the coil is powered by a voltage supply connected to each activation strip in the same way as described below for other embodiments. By controlling the magnetic field applied to each individual activation strip, the end of the optical fiber undulates dynamically and quickly to perform the switching function. For example, if two magneto-strictive strips are placed 180 degrees opposite each other longitudinally along the cylindrical mantle of a fiber, then the fiber can be made to move to either the left or the right by concurrently expanding one magneto-strictive strip while contracting the other magneto-strictive strip. The degree of movement to the left or to the right can be controlled by the amount of contraction or expansion of each of the magneto-strictive strips which is directly related to the strength of the magnetic field applied to each strip. Of course, additional magneto-strictive strips are adhered along the length of the fiber for a finer degree of control of movement in 2-½-D. Indeed, an entire sleeve or jacket of the material can envelop the fiber and is controlled by a plurality of electrodes upon the jacket.

Figure 8A:
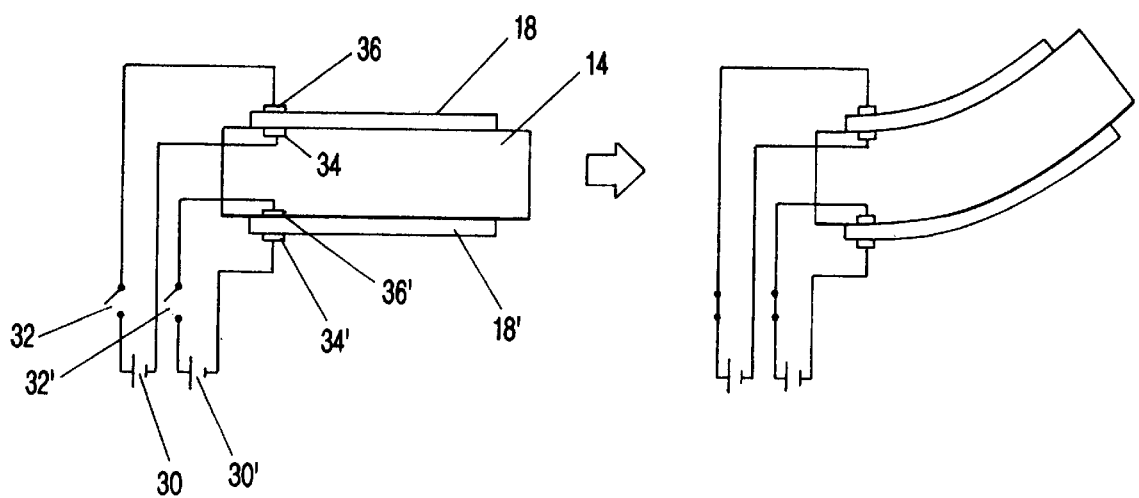
FIGS. 8a and 8b show a side view and cross-sectional view, respectively, of an optical fiber having two activation strips and electrodes on two sides of each activation strip at the same end.
Figure 8B:
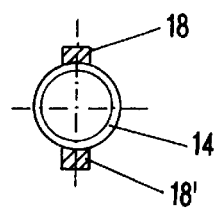

In a second embodiment, a plurality of piezoelectric, piezoceramic, or piezo-polymeric strips, such as lead zirconate titanate (PZT) or polyvinylidine difluoride (PVDF), approximately a few centimeters long, such as two cm, and of a width of a few microns are adhered in a symmetrical fashion longitudinally to each fiber near the end to be undulated. Piezoelectric materials are electrostrictive in the sense that if electrodes are attached to a strip having width, length and thickness, across the thickness and a voltage is applied, normally a high voltage of few 1000 volts, then they either contract or expand lengthwise. Piezoelectric materials expand or contract according to the polarity of their properties and of the voltage applied to them. FIGS. 8a and 8b show a side view and a cross-sectional view, respectively, of the second embodiment of the present invention. In this embodiment, activation strips 18 and 18' are adhered longitudinally along optical fiber 14 to be undulated. Voltage supplies 30 and 30' controlled by switches 32 and 32' supply voltage to strips 18 and 18' via positive electrodes 36 and 36' and negative electrodes 34 and 34' attached to each strip. Due to the way that the voltage supplies are connected, strip 18 is polarized opposite strip 18'. By closing switches 32 and 32', the voltage is applied to strips 18 and 18'. Accordingly, strip 18 contracts while strip 18' expands, causing fiber 14 to bend in an upward direction as shown in FIG. 8a.

Figure 9A:
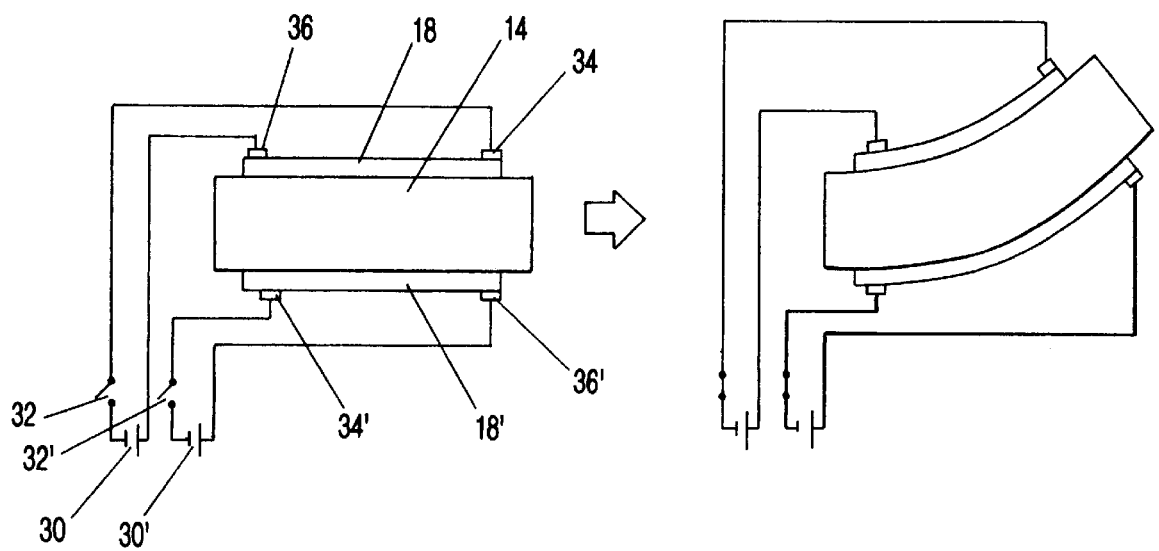
FIGS. 9a and 9b show a side view and cross-sectional view, respectively, of an optical fiber having two activation strips and electrodes on opposite ends of each activation strip.
Figure 9B:
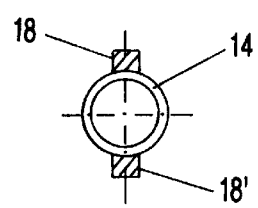

In a third embodiment, a plurality of shape-memory alloy wires or strips, such as Nitinol, approximately a few centimeters long, such as two cm, and of a width of a few microns are adhered in a symmetrical fashion longitudinally to each fiber near the end to be undulated. Shape-memory alloys either contract or expand due to a temperature transition from a solid phase of Martensite (crystalline structure is face-centered) to a solid phase of Austenite (crystalline structure is body-centered) due to direct electrode Joule heating of the material. Shape-memory alloys either contract or expand according to the polarity of a voltage applied to them. By controlling the amount of voltage applied to each strip, the end of the optical fiber undulates dynamically and quickly to perform the switching function. FIGS. 9a and 9b show a side view and a cross-sectional view, respectively, of the third embodiment in its simplest form. Two activation strips 18 and 18' are shown adhered 180 degrees opposite one another along the cylindrical length of optical fiber 14. Each activation strip 18 and 18' is controlled by voltage supplies 30 and 30', respectively. Switches 32 and 32' control the voltage supplied to the respective shape-memory wires. Positive electrodes 36 and 36' are attached to activation strips 18 and 18', respectively, but at opposite ends. Negative electrodes 34 and 34' are attached at opposite ends from positive electrodes 36 and 36' to activation strips 18 and 18'. As demonstrated in FIG. 9a, by closing switches 32 and 32', voltage is applied to activation strips 18 and 18' causing strip 18 to contract and strip 18' to expand. This is due to the fact that the voltage polarities across the two shape-memory strips are opposite. Because activation strip 18 contracts and activation strip 18' expands, and they are both directly adhered to optical fiber 14, optical fiber 14 bends in an upward direction. Reversing the polarities of the voltages applied to strips 18 and 18' will cause the fiber to bend downward instead.

While the figures show just two activation strips along the optical fiber, additional activation strips can be added for a finer degree of control. Any angle of movement with respect to the x and y axis can be accomplished by controlling the amount of voltage or the strength of the magnetic field required to activate the activation strips. For example, by adding a third and fourth activation strip such as shown in FIG. 2, where each activation strip is separated by 90° around the circumference of the fiber, and oppositely polarizing each of the two activation strips that are 180° opposite one another, a fiber can be undulated at any angle in the x y direction by controlling the amount of voltage applied to the activation strip pairs that are opposite one another.

In addition to the materials discussed above for activation purposes, a special material called ionic polymeric metal composite (IPMC) artificial muscles can be used for the activation means. This material is disclosed in pending U.S. patent application Ser. No. 09/101,856, to Mohsen Shahinpoor and Mehran Mojarrad, entitled "Soft Actuators and Artificial Muscles," and U.S. patent application Ser. No. 09/258,602, also to Mohsen Shahinpoor and Mehran Mojarrad, entitled "Ionic Polymer Sensors and Actuators," and the disclosures therein are herein incorporated by reference. See also M. Shahinpoor, Y. Bar-Cohen, J. Simpson and J. Smith, "Ionic Polymeric Metal Composites (IPMC) as Biomimetic Sensors, Actuators and Artificial Muscles—A Review," *J. Smart Materials & Structure,* Vol. 7, No. 4, pp. R15–R36, 1998, also incorporated herein by reference. This material may be advantageous by being more compatible with optical fiber material and more easily attachable or incorporated into fiber optic devices. The optical fiber can be entirely built from these electro- or magneto-active plastic materials which are essentially transparent before activation. When entirely built from IPMC artificial muscle, the material is cladded to have internal reflection and is coated with electrodes to cause the optical channel to undulate in 2½ dimensions when the material is activated via the electrodes.

In a fourth embodiment, a plurality of ionic polymeric metal composite, IPMC artificial muscle, activation strips approximately a few centimeters long, such as two cm, and of a width of a few microns are adhered in a symmetrical fashion longitudinally to each fiber near the end to be undulated. Artificial muscles in the form of strips with electrodes sputtered or plated on their surfaces across their thickness, naturally bend when subjected to a low voltage of a few volts, such as 2–5 volts, and amperages of approximately a few hundred milliamps. By "natural bending," one side contracts and one side expands, in distinction to magneto-strictive, piezoelectric, piezoceramic, piezopolymeric or shape-memory materials, which expand or contract more or less uniformly. The underlying theory is that ions within the material migrate to one side or the other and in doing so carry water with them causing swelling on one side (expansion) and deswelling on the other side (contraction). The strips, which either bend inward or outward, i.e., concave or convex, are powered by a pair of wires to a voltage supply connected to electrodes on the strips and can enable the optical fiber to undulate dynamically and quickly to perform the switching function. Upon applying voltage to the electrodes on the IPMC artificial muscle activation strips, the strips themselves bend either inward or outward direction. Therefore, a plurality of these strips can be adhered to the fiber for a finer degree of control in 2-½-D in much the same manner as described above with respect to piezoelectrics and shape-memory alloys.

Figure 10A:
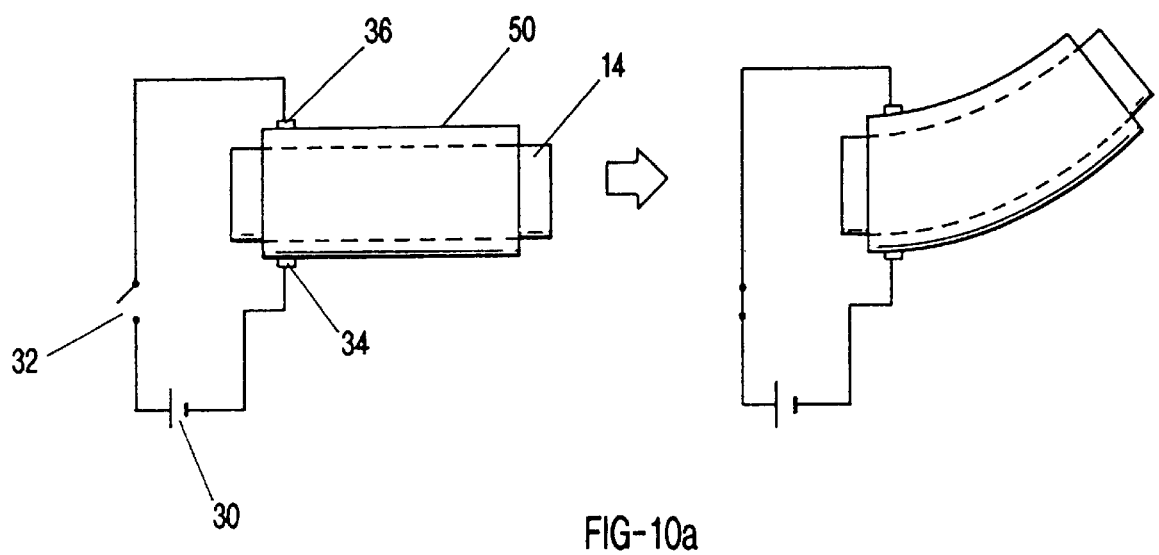
FIGS. 10a and 10b show an optical fiber surrounded by an artificial muscle and having two electrodes opposite each other at one end.
Figure 10B:
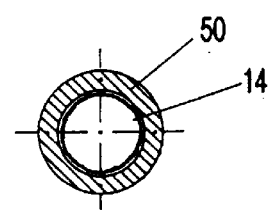

In a fifth embodiment, an appropriately electroded sleeve or tubular jacket of ionic polymeric conductor composite, IPMC artificial muscle, approximately a few centimeters long, such as two cm, and of a thickness of a few microns is adhered on the cylindrical mantle of each fiber near the end to be undulated. FIGS. 10a and 10b show a side view and a cross-sectional view, respectively, of the IPMC artificial muscle wrapped around optical fiber 14 as a jacket 50. Voltage supply 30 operated by switch 32 provides voltage to electrodes 34 and 36 upon IPMC jacket 50. Upon closing switch 32, voltage is supplied to electrodes 34 and 36, causing jacket 50 as a whole to bend in an upward direction. Additional electrode pairs are attached elsewhere upon jacket 50 to cause jacket 50 to bend in other directions as well.

In a sixth embodiment, the optical fiber is made entirely from IPMC muscle and is cladded appropriately to have internal reflection and coated appropriately with electrodes on the outside to allow activation for dynamic 2-½-D undulation in any optical fiber switching action.

Of course, any optical channel, be it an optical fiber, a group of fibers, or a fiber optic cable, can be moved in the same manners as described above. Also, it is to be understood that the fiber can be moved using combinations of the various activation strip materials described above. The activation strips are to be affixed to the input or output optical channels in accordance with the application for the switch. While only one direction of motion is shown in FIGS. 8–10, and a particular arrangement of electrodes and polarities is shown, it is to be understood that any direction of movement can be accomplished by varying locations of the activation strip or strips, polarities, and number of strips. In all of the embodiments presented, the voltage need not be a constant voltage, but can of course be either variable voltage waveform that varies in frequency, amplitude, or polarity, or any combination of those three so as to control undulation frequency of the fiber, fibers, or cable.

The present invention may be used in telecommunications for signal on-off control; signal routing from one destination to another; signal attenuation; signal combination by having two or more outgoing bundles from two or more sources to be formed into a single bundle; and signal splitting as to send a signal to more than one destination. The invention may be located at either the transmitting or receiving terminals of a communication channel or any intermediate location. As with any electromechanical device, the functioning bandwidth of the undulation frequency of the switch spans a fraction of Hz to an upper limit of a few kilo Hz.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical switch comprising an artificial muscle activation material adhered longitudinally around said at least one input optical channel to cause said at least one input optical channel to undulate in 2½dimensions and align with the desired output optical channels when said material is activated.

2. The switch of claim 1 wherein said artificial muscle activation material is adhered longitudinally around an end of said at least one input optical channel.

3. The switch of claim 1 wherein said activation material is activated with a source that varies in at least one of amplitude, frequency, or polarity.

4. The switch of claim 1 wherein said activation material comprises a material selected from the group consisting of a plurality of artificial muscle activation strips and an artificial muscle jacket.

5. The switch of claim 4 wherein said activation material comprises a plurality of artificial muscle activation strips arranged symmetrically around said at least one input optical channel.

6. The switch of claim 5 wherein said plurality of activation strips comprises at least three activation strips arranged symmetrically around said at least one input optical channel.

7. The switch of claim 6 wherein said at least three activation strips comprises four activation strips, and wherein two of said four activation strips are oppositely polarized and located approximately 180 degrees opposite one another, and the remaining two are oppositely polarized and located approximately 180 degrees opposite one another and orthogonal to the first two.

8. An optical switch comprised of:
    an input having a plurality of input optical channels;
    a spherical segment output having a plurality of output optical channels arranged spherically around said input; and
    an artificial muscle activation material adhered longitudinally around said input optical channels to cause said input optical channels to undulate in 2½ dimensions and align with the desired output optical channels when said activation material is activated.

9. The switch of claim 8 wherein said artificial muscle activation material is adhered longitudinally around an end of each of said input optical channels to cause that end to undulate.

10. The switch of claim 8 wherein said activation material is activated with a source that varies in at least one of amplitude, frequency, or polarity.

11. The switch of claim 8 wherein said activation material comprises a material selected from the group consisting of a plurality of artificial muscle activation strips and an artificial muscle jacket.

12. The switch of claim 8 wherein said activation material comprises a plurality of artificial muscle activation strips arranged symmetrically around said input optical channels.

13. The switch of claim 12 wherein said plurality of activation strips comprises at least three activation strips arranged symmetrically around said input optical channels.

14. The switch of claim 13 wherein said at least three activation strips comprises four activation strips, and wherein two of said four activation strips are oppositely polarized and located approximately 180 degrees opposite one another, and the remaining two are oppositely polarized and located approximately 180 degrees opposite one another and orthogonal to the first two.

15. A method of switching optical channels, the method comprising the steps of adhering an artificial muscle material longitudinally around an optical channel and activating the material to cause the channel to undulate in 2½ dimensions.

16. The method of claim 15 wherein the step of activating the material comprises activating the material with a source that varies in at least one of amplitude, frequency, or polarity.

17. The method of claim 15 wherein the step of adhering an artificial muscle comprises:
    a) providing at least one input optical channel with a first end and a second end, wherein the artificial muscle material is adhered longitudinally around the first end;
    b) providing at least two output optical channels arrayed within 2½ dimensions of the first end of the at least one input optical channel; and
    wherein the step of activating the artificial muscle material comprises:
    c) activating the artificial muscle material to cause the first end of the at least one input optical channel to undulate in 2½ dimensions to align with one of the at least two output optical channels.

18. The method of claim 15 wherein adhering an artificial muscle material longitudinally around an optical channel comprises adhering a material selected from the group consisting of a plurality of artificial muscle activation strips and an artificial muscle jacket.

19. The method of claim 15 wherein adhering an artificial muscle material comprises adhering a plurality of artificial muscle activation strips longitudinally around an optical channel and arranging the activation strips symmetrically around the channel.

20. The method of claim 19 wherein adhering a plurality of activation strips comprises adhering at least three activation strips arranged symmetrically around the channel.

21. The method of claim 20 wherein adhering at least three activation strips comprises:
    a) adhering four activation strips symmetrically around the channel;
    b) oppositely polarizing two of the four activation strips and locating them approximately 180 degrees opposite one another on the channel; and
    c) oppositely polarizing the remaining two activation strips and locating them approximately 180 degrees opposite one another and orthogonal to the first two.

22. A method of optical switching, the method comprising the steps of:
    a) providing an input having a plurality of input optical channels;
    b) providing a spherical segment output having a plurality of output optical channels arranged spherically around the input; and
    c) adhering an artificial muscle material longitudinally around the input optical channels and activating the material to cause the input optical channels to undulate in 2½ dimensions and align with desired output optical channels.

23. An optical channel comprising an artificial muscle activation material cladded to have internal reflection, and electrodes coated upon said activation material to cause said optical channel to undulate in 2½ dimensions when said material is activated via said electrodes.

* * * * *